(No Model.)
F. D. CABLE.
BICYCLE SADDLE.
No. 494,408. Patented Mar. 28, 1893.
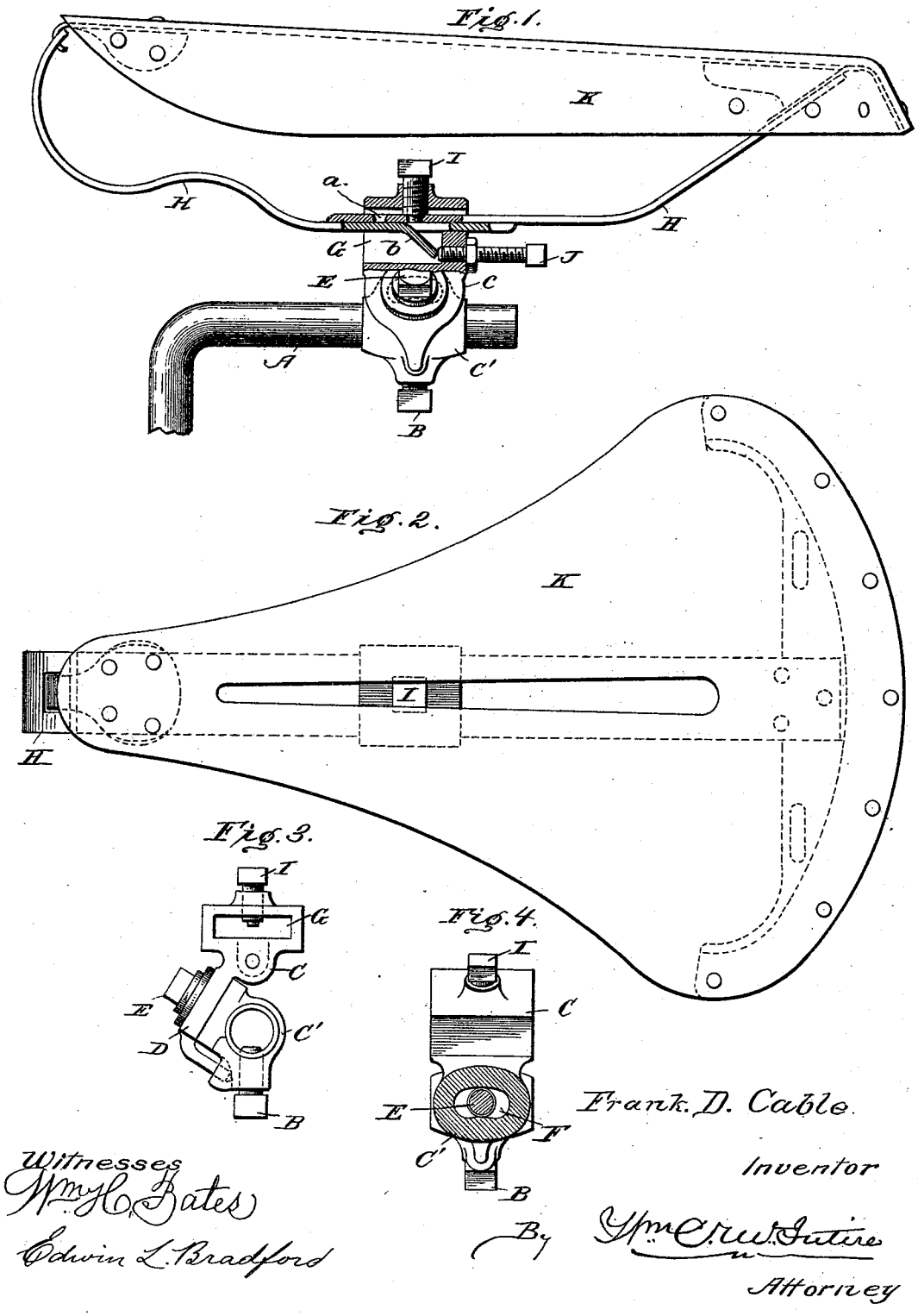
Witnesses
Wm H. Bates
Edwin L. Bradford
Frank D. Cable
Inventor
By [signature]
Attorney

UNITED STATES PATENT OFFICE.

FRANK D. CABLE, OF TOLEDO, OHIO, ASSIGNOR TO THE YOST MANUFACTURING COMPANY, OF SAME PLACE.

BICYCLE-SADDLE.

SPECIFICATION forming part of Letters Patent No. 494,408, dated March 28, 1893.

Application filed August 9, 1892. Serial No. 442,568. (No model.)

*To all whom it may concern:*

Be it known that I, FRANK D. CABLE, a citizen of the United States, residing at Toledo, in the county of Lucas and State of Ohio, have invented certain new and useful Improvements in Bicycle-Saddles; and I do hereby declare the following to be a full, clear, and exact description of the invention, such as will enable others skilled in the art to which it appertains to make and use the same.

My invention relates to certain new and useful improvements in saddles for bicycles.

It has for its object to provide a simple and efficacious means for "scorching" the saddle and adjusting it to all the requirements of a saddle for comfortable and expert riding, and with these ends in view my invention consists in the details of construction hereinafter fully described and specifically claimed.

In order that those skilled in the art to which my invention appertains may know how to make and use the same I will proceed to describe its construction and the manner in which it may be properly adjusted, referring by letters of reference to the accompanying drawings in which—

Figure 1 is a side elevation, partly in section, of my improved saddle secured in position to a saddle post. Fig. 2 is a top or plan view of the same. Fig. 3 is a front view of the adjusting bracket or bridge between the saddle post and saddle spring; and Fig. 4 is a side view of the same, partly in section, showing the limit of adjustability.

Similar letters of reference indicate like parts in the several figures.

A is the saddle post to which the bracket or bridge is secured in any longitudinal relation by the set screw or bolt B; this saddle connecting bracket is composed of two parts C, C'. The lower part C' is composed of the collar adapted to receive the saddle post and set screw B, and is turned obliquely and dressed flat as seen at Fig. 3 to receive the oblique extension D of the upper portion C, the two parts C, C', being secured together by the screw bolt E, and in order that the saddle which is supported in the upper end of the bracket may be tilted in either direction out of a horizontal line, the extension D of the portion C is provided with a curved slot F (see Fig. 4) through which the securing bolt E passes. The oblique connection as shown between the parts C and C' of the bracket it will be seen enables the saddle to be brought closer to the saddle post, than could be the case if the two parts of the bracket joined in a true vertical plane. The upper portion C of the bracket is formed with a recess G, as shown at Fig. 3, to receive the ends of the saddle spring. The recess G in either case is of such proportions as to receive the ends of the front spring H and rear spring H'. The end of the rear spring H' is formed with two or more holes $a$ adapted to receive the shouldered and reduced end of the binding screw I; and the end of the front spring H is cut and punched down to form an oblique tongue $b$, which extends down into the slot G of the bracket C, the end of said tongue $b$ abutting against a set screw J, passing through the solid portion of the rear portion of the upper portion C of said bracket, as clearly shown at Fig. 1. From this construction of the saddle spring in two parts H and H', with the ends overlapping within the bracket and formed as described, it will be seen that the two ends may be clamped in any given or desired relation to each other by the clamping bolt or screw I, and that by slightly releasing the clamping action of the bolt I, the front spring may be forced forward through the medium of the screw J, and the thus changed relation of the two springs be secured and maintained by again screwing down the bolt I, or, after such adjustment of the front spring H, the bolt I may be raised sufficiently to release its reduced end from one of the holes $a$ in the spring H', and the latter moved to bring another of the holes $a$ in position to be entered by said bolt, and in this manner the tension of either or both of the springs H and H' may be increased or diminished, for scorching the saddle for expert riding, or rendering it yielding and comfortable for ordinary pleasure riding.

The outer ends of the springs H and H' are secured to the saddle proper K in any well known or desirable manner.

From the construction shown and described it will be seen that the saddle may be readily adjusted longitudinally upon the arm of the saddle post A and secured in position by the securing bolt or screw B, that it may be tilted forward or backward by changing the axial relation of the portions C and C' of the bracket, and securing them again by the clamping bolt E, and that either or both halves H and H' of the compound spring may have the tension varied at will in the manner hereinbefore described.

Having described the construction, operation, and advantages of my improvements, what I claim as new, and desire to secure by Letters Patent, is—

1. In saddles for bicycles the bracket for connecting the saddle post and saddle spring, composed of two parts C, C', connected adjustably on an oblique line by a screw bolt E whereby the distance between the saddle and saddle post is reduced, substantially as and for the purpose set forth.

2. In combination with the saddle K, and bracket provided with a slot or recess to receive the ends of the springs, the springs H and H', one provided with the tongue $b$, and the other with the holes $a$, and the clamping and adjusting bolts or screws I, J, substantially as and for the purposes set forth.

In testimony whereof I affix my signature in presence of two witnesses.

FRANK D. CABLE.

Witnesses:
CHAS. A. YOST,
JOS. R. YOST.